US011663429B2

(12) United States Patent
McGavock, Jr. et al.

(10) Patent No.: US 11,663,429 B2
(45) Date of Patent: May 30, 2023

(54) DEVICE CONFIGURATION USING QR AND OTHER MACHINE READABLE CODES

(71) Applicant: Siemens Mobility, Inc., New York, NY (US)

(72) Inventors: Richard Alan McGavock, Jr., Columbia, MO (US); Nathan Clanney, Corona, CA (US)

(73) Assignee: Siemens Mobility, Inc., New York, NY (US)

( * ) Notice: Subject to any disclaimer, the term of this patent is extended or adjusted under 35 U.S.C. 154(b) by 229 days.

(21) Appl. No.: 16/753,953

(22) PCT Filed: Oct. 25, 2017

(86) PCT No.: PCT/US2017/058256
§ 371 (c)(1),
(2) Date: Apr. 6, 2020

(87) PCT Pub. No.: WO2019/083521
PCT Pub. Date: May 2, 2019

(65) Prior Publication Data
US 2020/0311364 A1    Oct. 1, 2020

(51) Int. Cl.
*G06K 7/14* (2006.01)
*G06F 16/23* (2019.01)
*G05B 19/042* (2006.01)
*G06K 19/06* (2006.01)
*G06Q 10/20* (2023.01)

(52) U.S. Cl.
CPC ....... *G06K 7/1417* (2013.01); *G05B 19/0426* (2013.01); *G06F 16/2379* (2019.01); *G06K 19/06037* (2013.01); *G06Q 10/20* (2013.01); *G05B 2219/23146* (2013.01)

(58) Field of Classification Search
CPC ........... G06K 7/1417; G06K 19/06037; G06F 16/2379; G05B 19/0426; G05B 2219/23156; G06Q 10/20
See application file for complete search history.

(56) References Cited

U.S. PATENT DOCUMENTS

| | | | |
|---|---|---|---|
| 8,448,158 B2 | 5/2013 | Ito et al. | |
| 8,924,712 B2 | 12/2014 | Varadarajan et al. | |
| 10,037,015 B2* | 7/2018 | Warrier | H04L 41/0843 |
| 2013/0230627 A1 | 9/2013 | Hansen et al. | |
| 2015/0371005 A1* | 12/2015 | Schneider | G16H 40/63 705/2 |
| 2016/0191318 A1 | 6/2016 | Neilson et al. | |
| 2017/0094021 A1* | 3/2017 | Brech | G06F 11/1433 |

OTHER PUBLICATIONS

PCT International Search Report and Written Opinion of International Searching Authority dated Feb. 20, 2018 corresponding to PCT International Application No. PCT/US2017/058256 filed Oct. 25, 2017.

* cited by examiner

*Primary Examiner* — Laura A Gudorf

(57) ABSTRACT

A system and method providing device configuration using quick response (QR) and/or other machine readable codes. The system and method reduce the time and costs associated with configuring devices/equipment based on site plans while also reducing the potential for errors during the configuration process.

16 Claims, 2 Drawing Sheets

DEVICE CONFIGURATION USING QR AND OTHER MACHINE READABLE CODES

BACKGROUND

1. Field

Embodiments disclosed herein relate to a system and method for configuring a device and, more particularly, to a system and method providing device configuration using quick response (QR) and/or other machine readable codes.

2. Description of the Related Art

Currently, when setting up electronic equipment for use e.g., at railroad crossings, railroad/maintenance personnel must refer to site plans that specify how to configure each device or piece of equipment at the crossing. They may also refer to these site plans after the initial setup to ensure that unauthorized changes have not been made to any of the devices. As can be appreciated, any deviation from the site plans could result in a serious safety issue because the equipment will not be properly configured. In addition, the deviations could result in a violation of the Federal Railroad Administration's requirement that the device configuration matches the site plans.

Initially, setting up the devices can be a laborious and time consuming process in both the factory and the field. For example, there is always some amount of on-site configuration required by the user. Typically, the majority of this configuration is site specific and is not covered by generic tools, processes or software. To date, these configuration values have been populated by personnel reading values from the site plans and manually entering them into each device. This process is both time consuming and subject to data entry errors, which are undesirable.

At the end of the configuration process, the railroad/maintenance personnel can verify that each manual entry was done correctly by comparing a device generated check number with a check number listed on the site plans. Unfortunately, not all devices generate a check number, especially those not vital to safe railroad operation, and therefore configuration errors may still occur. A large amount of time can be spent tracking down the cause of a mismatch between the device configuration and the site plans. As can be appreciated, this situation is also undesirable.

Accordingly, there is a need and desire for a mechanism for reducing the time and costs associated with configuring devices/equipment based on site plans while also reducing the potential for errors during the configuration process.

SUMMARY

Embodiments disclosed herein provide a system and method providing device configuration using quick response (QR) and/or other machine readable codes.

In one embodiment, a method of configuring a device is provided. The method comprises: generating, using a processor, electronic configuration settings for the device based on first site plans, the electronic configuration settings including a safety check value; generating, using a code generator, one or more machine readable codes associated with the electronic configuration settings; generating modified site plans for the device by applying the one or more machine readable codes to the first site plans for the device; reading, by a machine readable code reader connected to the device, the one or more codes from the modified site plans to obtain the electronic configuration settings and safety check value; and configuring the device based on the electronic configuration settings.

In another embodiment, a system for configuring a device is provided. The system comprises a computer workstation comprising a processor and a machine readable code reader connected to the device. The processor is adapted to: generate electronic configuration settings for the device based on first site plans, the electronic configuration settings including a safety check value; generate, using a code generator, one or more machine readable codes associated with the electronic configuration settings; and generate modified site plans for the device by applying images of the one or more machine readable codes to the first site plans for the device. The reader is adapted to: read the images of the one or more codes from the modified site plans to obtain the electronic configuration settings and safety check value, and transmit the electronic configuration settings to the device to configure the device.

Further areas of applicability of the present disclosure will become apparent from the detailed description, drawings and claims provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

BRIEF DESCRIPTION OF THE DRAWINGS

Like reference symbols in the various drawings indicate like elements.

DETAILED DESCRIPTION

The components and materials described hereinafter as making up the various embodiments are intended to be illustrative and not restrictive. Many suitable components and materials that would perform the same or a similar function as the materials described herein are intended to be embraced within the scope of embodiments of the present invention.

The disclosed embodiments provide a system and method providing device configuration using quick response (QR) and/or other machine readable codes. The disclosed system and method reduce the time and costs associated with configuring devices/equipment based on site plans while also reducing the potential for errors during the configuration process. In one embodiment, these advantages are accomplished by embedding configuration values in a QR or other machine readable code, which are then printed on the site plan(s). Hereinafter, the terms "machine readable code" or "machine readable codes" refer generally to QR and other machine readable codes that are appropriate for practicing the disclosed embodiments. Each device requiring configuration will be capable of either reading the machine readable code (either natively or with a plug-in accessory) or receiving configuration data from a networked device that can read the code. In one embodiment, for situations where the configuration data requires more capacity than a single code can provide, multiple codes may be printed on the plans or a communication link could be utilized to pull the data from a secure server (i.e., a server link and/or reference identifier is embedded in the code for accessing the information from the server).

In operation, rather than having to enter each configuration value manually into the device/equipment being configured, the user can simply scan the machine readable code or codes, eliminating the potential for manual data entry configuration errors. In addition, the code/codes may be scanned from the site plan(s) whenever the existing configuration needs to be verified by either railroad or Federal Railroad Administration personnel. As such, the disclosed embodiments provide a means for determining whether the previously configured device/equipment have deviated from the intended configuration.

Figure 1:
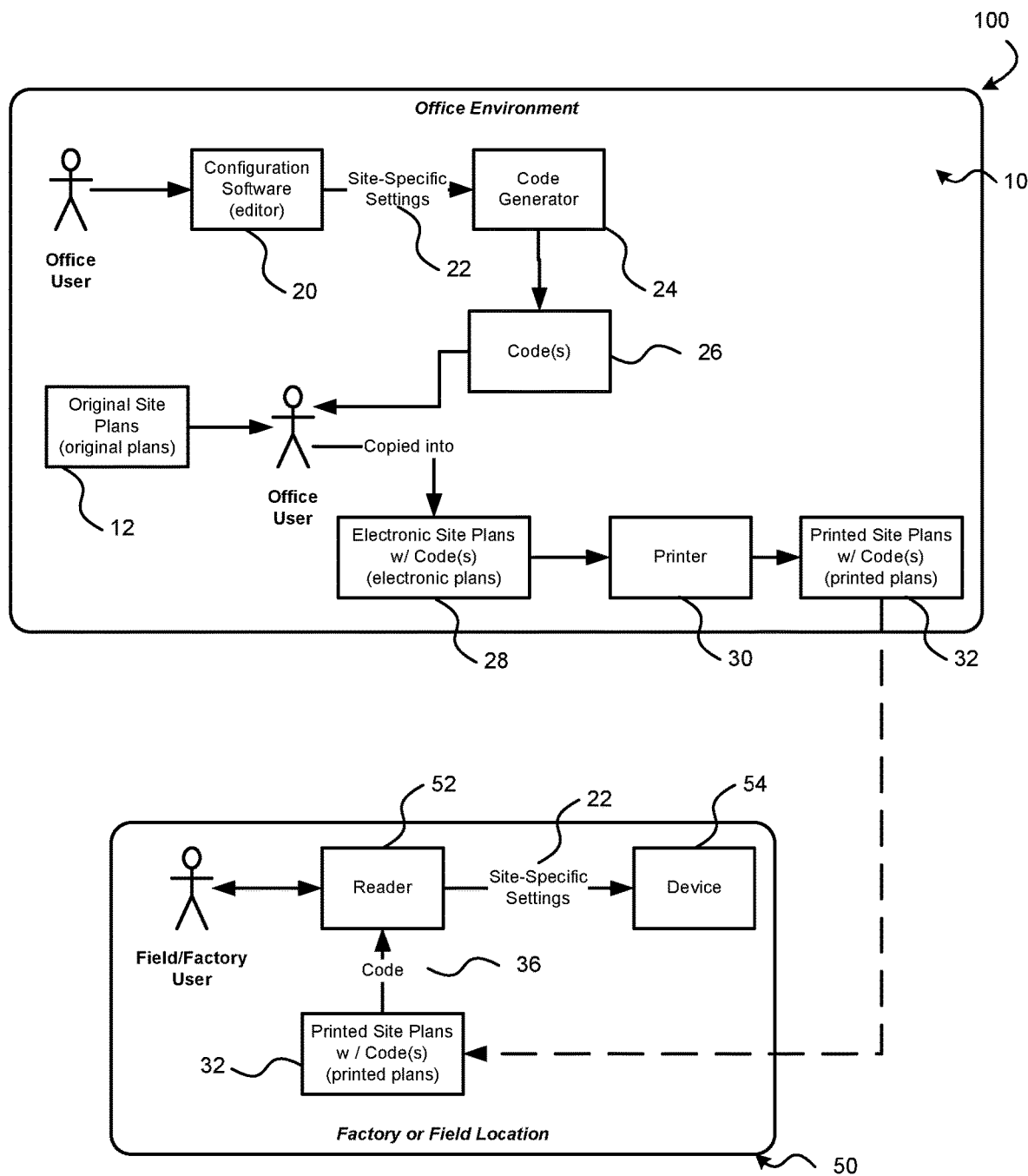
FIG. 1 illustrates an example system constructed in accordance with an embodiment disclosed herein.

FIG. 1 illustrates an example system 100 adapted to provide device configuration using quick response (QR) and/or other machine readable codes in accordance with the disclosed principles. In the illustrated embodiment, a first portion of the system 100 is implemented in an office environment 10 and a second portion of the system 100 is implemented within a factory or at a field location, referred to herein as the "configuration environment 50." The configuration environment 50 also includes the device/equipment 54 to be configured, which in this example is a grade crossing predictor (GCP) for a railroad.

In the illustrated embodiment, one or more machine readable codes 26 that include all of the necessary information for the configuration environment 50 are printed on site plans 12 forming printed modified site plans 32 in accordance with the disclosed principles. Because all of the necessary information for the configuration environment 50 is included on the modified site plans 32, no additional network access is required to complete the configuration of the device/equipment 54 as explained below in more detail.

The following example will be described in reference to the configuration of a railroad GCP typically installed at a railroad crossing. It should be appreciated, however, that the embodiments disclosed herein can be used to configure other railroad devices/equipment 54. Moreover, the embodiments disclosed herein can be used to configure other devices/equipment 54 outside the railroad industry. Accordingly, the disclosed embodiments should not be limited to a GCP or railroad device/equipment.

In the office environment 10, an office user enters site-specific settings and data for the device/equipment 54 (e.g., GCP) using a configuration software editor 20 running on e.g., a computer or computer workstation. The editor 20 can be any configuration editing tool used for the end product (e.g., a GCP). In one embodiment, the editor 20 is an "Office Configuration Editor" as is known in the railroad art. The site-specific settings entered by the office user also include safety-critical information. The editor 20 generates a safety check code from the safety critical information using e.g., a cyclic redundancy check (CRC) algorithm. As shown in FIG. 1, the editor 20 outputs electronic/digital site-specific settings 22 for the GCP, which also include the safety check code.

The site-specific settings 22 output by the editor 20 are input into a machine readable code generator 24. The generator 24 creates one or more machine readable codes 26, embedding the site-specific information and the safety check code into the one or more codes 26. In one embodiment, each machine readable code 26 is a QR code. The machine readable code(s) 26 could be stored in any computer compatible file format, such as BMP, PNG, JPG, etc., so that it may be used in a subsequent process (described below).

If there is more configuration information than can be stored in a single code, multiple machine readable codes 26 will be generated. In one embodiment, each code 26 will include an code/image number and an indication of the total number of code/images (e.g., code/image 1 of 5). If the machine readable code is implemented as a QR code, it known that there are multiple sizes of QR code images with various levels of error correction and data density. Accordingly, in an embodiment in which the machine readable code is implemented as a QR code, the image size, error correction, and data density can be set by the office user at design time.

An image of the one or machine readable codes 26 generated by the generator 24 are copied into an electronic version of the original site plans 12, forming electronic site plans with the one or machine readable codes integrated therein, referred to herein as the "electronic modified site plans 28." This process can be performed in the same computer or computer workstation executing the configuration software editor 20. Alternatively, this process can be performed in a different computer or computer workstation, if desired. Due to the one or more machine readable codes 26, the electronic modified site plans 28 will include all of the site-specific configuration settings, their values and the safety check code—all of which are required by the configuration environment 50 to ensure the proper configuration of the device/equipment 54. At this point, if the office user chose to, he or she could use a machine readable code reader to check the values on the electronic modified site plans 28. That is, the user can determine if the electronic modified site plans 28 include the proper site settings to determine if there was an error during the initial manual data entry of the site settings into the editor 20.

In the illustrated embodiment, the system 100 also includes a printer 30 that is used to print out the electronic modified site plans 28, forming printed modified site plans with the one or more machine readable codes integrated therein, referred to herein as the "printed modified site plans 32." The printed modified site plans 32 are transported to the configuration environment 50 such that they can be used to configure the device/equipment 54, which in the illustrated example is a railroad GCP.

The configuration environment 50 will include at least one machine readable code reader 52 and the device/equipment 54 being configured. In one embodiment, the reader 52 can be a cellular phone (i.e., a smartphone) with a machine readable code reader application or other software included therein for controlling the phone in a manner allowing it to scan and decode the codes 26 on the printed modified site plans 32. In one embodiment, the reader 52 can be a tablet device with a machine readable code reader application or software included therein for controlling the tablet in a manner allowing it to scan and decode the codes 26 on the printed modified site plans 32. In one embodiment, the reader 52 could be an add-on accessory built into the device/equipment 54 being configured.

In one embodiment, the reader 52 is connected to the device/equipment 54 being configured via a cable or other suitable connection. In one embodiment, the reader 52 is connected to the device/equipment 54 via a connection such as e.g., a wireless local network connection. It should be appreciated that the disclosed embodiments should not be limited to one specific form of connection and that any suitable connection mechanism can be used to practice the disclosed principles.

In operation, the field user scans the machine readable code(s) 26 from the printed modified site plans 32. Because there may be more than one machine readable code, the reader 52 must be adapted to read all of them. Therefore, the reader 52 will be adapted to read the code/image number and the total number of codes/images from the printed codes 26 on the printed modified site plans 32. If all codes are not scanned, the reader 52 will not send the site-specific settings 22 to the device/equipment 54 being configured. When the reader 52 determines that all of the codes 26 have been scanned, the site-specific settings 22 will be output to the device/equipment 54.

In one embodiment, the field user will enter into the reader 52 the safety check code that was sent to the code generator 24 in the office environment 10. The reader 52 will compare that code with the safety check code embedded in the machine readable code(s) 26. If the codes do not match, the reader 52 will output an error indication and will not send settings 22 to the device/equipment 54. If the codes match, the reader 52 will send the configuration settings 22 to the device/equipment 54.

At this point, the field user may also view the settings on the device/equipment 54 and compare them to the printed modified site plans 32, if they chose to. This would be a manual check to determine that the device/equipment 54 was properly configured or not. If the user determines that there was an error, the device/equipment 54 should be configured again or other appropriate measures should be taken.

Figure 2:
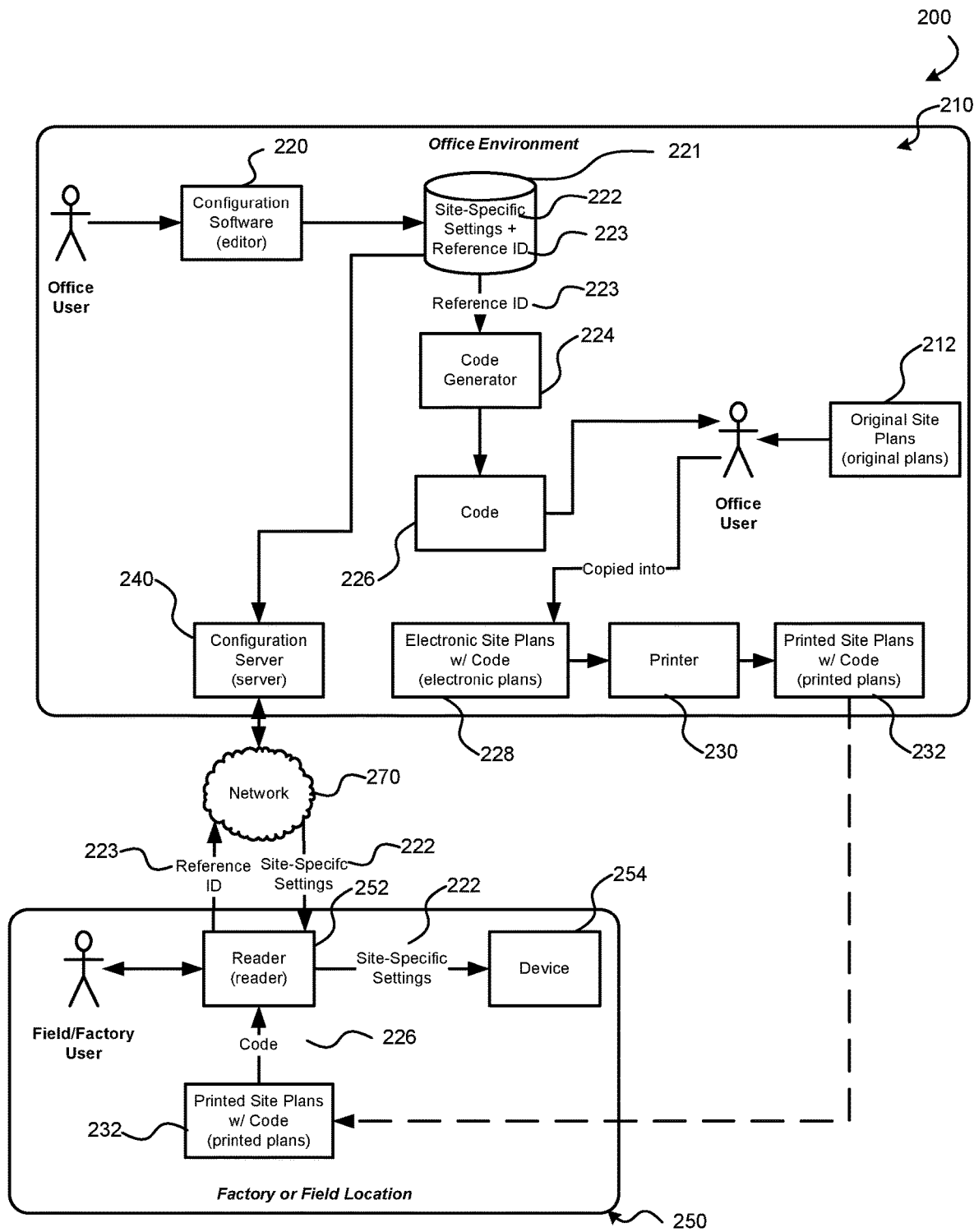
FIG. 2 illustrates another example system constructed in accordance with another embodiment disclosed herein.

FIG. 2 illustrates an example system 200 adapted to provide device configuration using quick response (QR) and/or other machine readable codes in accordance with the disclosed principles. In the illustrated embodiment, a first portion of the system 200 is implemented in an office environment 210 and a second portion of the system 200 is implemented within a factory or at a field location, referred to herein as the "configuration environment 250." The configuration environment 250 also includes the device/equipment 254 to be configured, which in this example is a GCP for a railroad.

In the illustrated embodiment, rather than embedding all of the configuration values into one or more machine readable codes, only a reference identifier (ID) 223 is embedded into a machine readable code 226 whose image is then printed onto site plans 212, forming printed modified site plans 232. The reference ID 223 is used when accessing a database on an external device such as e.g., a server computer to retrieve the site-specific settings 222 in the manner described below.

The following example will be described in reference to the configuration of a railroad grade crossing predictor (GCP) typically installed at a railroad crossing. It should be appreciated, however, that the embodiments disclosed herein can be used to configure other railroad devices/equipment 254. Moreover, the embodiments disclosed herein can be used to configure other devices/equipment 254 outside the railroad industry. Accordingly, the disclosed embodiments should not be limited to GCP or railroad device/equipment.

In the office environment 210, an office user enters site-specific settings and data for the device/equipment 254 (e.g., GCP) using a configuration software editor 220 running on e.g., a computer or computer workstation. The editor 220 can be any configuration editing tool used for the end product (e.g., a GCP). In one embodiment, the editor 220 is an "Office Configuration Editor" as is known in the railroad art. The site-specific settings entered by the office user also include safety-critical information. The editor 220 generates a safety check code from the safety critical information using e.g., a cyclic redundancy check (CRC) algorithm.

As shown in FIG. 2, the editor 220 outputs to a database 221 electronic/digital site-specific settings 222 for the GCP, which also include the safety check code. The database 221 may be part of a configuration server 240, computer or other storage medium accessible over a network 270 (e.g., the Internet or a local or wide area network). The site specific settings 222 stored in the database 221 are assigned a reference ID 223.

The reference ID 223 and safety check code output by the editor 220 is input into a machine readable code generator 224. The generator 224 creates a machine readable code 226, embedding the reference ID 223 and check code into the code 226. In one embodiment, the machine readable code 226 is a QR code. The machine readable code 226 could be stored in any computer compatible file format, such as BMP, PNG, JPG, etc., so that it may be used in a subsequent process (described below).

If the machine readable code is implemented as a QR code, it known that there are multiple sizes of QR code images with various levels of error correction and data density. Accordingly, in an embodiment in which the machine readable code is implemented as a QR code, the image size, error correction, and data density can be set by the office user at design time.

The machine readable code 226 generated by the generator 224 is copied into an electronic version of the original site plans 212, forming electronic site plans with the machine readable code integrated therein, referred to herein as the "electronic modified site plans 228." This process can be performed in the same computer or computer workstation executing the configuration software editor 220. Alternatively, this process can be performed in a different computer or computer workstation, if desired. The electronic modified site plans 228 will include all of the site-specific configuration settings, their values, the reference ID 223 and the safety check code—all of which are required by the configuration environment 250 to ensure the proper configuration of the device/equipment 254. At this point, if the office user chose to, he or she could use a machine readable code reader to check the values on the electronic modified site plans 228. That is, the user can determine if the electronic modified site plans 228 include the proper site settings to determine if there was an error during the initial manual data entry of the site settings into the editor 220.

In the illustrated embodiment, the system 200 also includes a printer 230 that is used to print out the electronic modified site plans 228, forming printed modified site plans with the machine readable code 226 integrated therein, referred to herein as the "printed modified site plans 232." The printed modified site plans 232 are transported to the configuration environment 250 such that they can be used to configure the device/equipment 254, which in the illustrated example is a railroad GCP.

The configuration environment 250 will include at least one machine readable code reader 252 and the device/equipment 254 being configured. In one embodiment, the reader 252 can be a cellular phone (i.e., a smartphone) with a machine readable code reader application or other software included therein for controlling the phone in a manner allowing it to scan and decode the image of code 226 on the printed modified site plans 232. In one embodiment, the reader 252 can be a tablet device with a machine readable code reader application or software included therein for controlling the tablet in a manner allowing it to scan and decode the code 226 on the printed modified site plans 232.

In one embodiment, the reader 252 could be an add-on accessory built into the device/equipment 254 being configured.

The field user connects the reader 252 to the device/equipment 254 (e.g., GCP) and the network 270, which can access the configuration server 240. In one embodiment, the reader 252 is connected to the device/equipment 254 via a cable or other suitable connection. In one embodiment, the reader 252 is connected to the device/equipment 254 via a connection such as e.g., a wireless local network connection. In one embodiment, the reader 252 is connected to the network 270 via a cable or other suitable connection. In one embodiment, the reader 252 is connected to network 270 wirelessly. It should be appreciated that the disclosed embodiments should not be limited to one specific form of connection and that any suitable connection mechanism can be used to practice the disclosed principles.

In operation, the field user scans the machine readable code 226 from the printed modified site plans 232. The field user may also hand enter the safety check code from the plans 232 into the reader 252. The reader 252 will compare the safety check code from the plans 232 with the safety check code embedded in the machine readable code image 226. If the codes do not match, the reader 252 will output an error indication and will not access the configuration server 240 or the device/equipment 254. If the codes match, the reader 252 will send the reference ID 232 to the configuration server 240. The server 240 will reply with the site specific configuration settings 232 for the device/equipment 254. The reader 252 will send the configuration settings 222 to the device/equipment 254.

At this point, the field user may also view the settings on the device/equipment 254 and compare them to the printed modified site plans 232, if they chose to. This would be a manual check to determine that the device/equipment 254 was properly configured or not. If the user determines that there was an error, the device/equipment 254 should be configured again or other appropriate measures should be taken.

In one embodiment, a combination of the two system/methods could be used. That is, some information is embedded in codes while other information is accessed from the networked database/server using a reference ID. It should be appreciated that this embodiment would not be limited to what information is stored in a code and/or database/server.

Accordingly, the disclosed principles offer many advantages over the existing site plan-based device/equipment configuration techniques. For example, the disclosed systems 100, 200 and their operating methods save time because manual entry of configuration settings into the device/equipment being configured is not required. Moreover, the disclosed systems 100, 200 and their operating methods significantly reduce data entry errors as the configuration information is populated and checked automatically instead of manually.

In addition, subsequent Federal inspections and/or routine maintenance can use the principles disclosed herein to determine if the device/equipment's configuration has been changed since its initial configuration. Thus, the disclosed principles can be used to determine if unauthorized changes have been made to the device/equipment configured in the disclosed manner. As such, deviations from the site plans that could result in a serious safety issue and/or a violation of Federal Railroad Administration's requirements.

The disclosed principles provide these and other advantages for many technical fields of use. For example, and as discussed above, one use of the disclosed systems 100, 200 and their operating methods applies to the configuration of railroad equipment such as e.g., a GCP. It should be appreciated that the disclosed principles could be used with any applications where devices are used that have pre-determined, site specific configuration values that require manual entry in either the factory or the field.

The foregoing examples are provided merely for the purpose of explanation and are in no way to be construed as limiting. Further areas of applicability of the present disclosure will become apparent from the detailed description, drawings and claims provided hereinafter. While reference to various embodiments is made, the words used herein are words of description and illustration, rather than words of limitation. Further, although reference to particular means, materials, and embodiments are shown, there is no limitation to the particulars disclosed herein. Rather, the embodiments extend to all functionally equivalent structures, methods, and uses, such as are within the scope of the appended claims.

Additionally, the purpose of the Abstract is to enable the patent office and the public generally, and especially the scientists, engineers and practitioners in the art who are not familiar with patent or legal terms or phraseology, to determine quickly from a cursory inspection the nature of the technical disclosure of the application. The Abstract is not intended to be limiting as to the scope of the present inventions in any way.

We claim:

1. A method of configuring a device, said method comprising:

generating, using a processor, electronic configuration settings for the device, the electronic configuration settings including site-specific settings and a safety check value, wherein the site-specific settings are associated with a factory or field location of the device;

generating, using a code generator, one or more machine readable codes associated with the electronic configuration settings;

generating a second modified medium for the device by applying images of the one or more machine readable codes to a first medium;

reading, by a machine readable code reader connected to the device, the images of the one or more codes from the second modified medium to obtain the electronic configuration settings including the site-specific settings and the safety check value;

comparing, by the machine readable code reader connected to the device, the safety check value associated with the one or more machine readable codes with a safety check value input by a user into the machine readable code reader; and configuring the device based on the electronic configuration settings in response to a matched safety check value, wherein said generating electronic configuration settings for the device comprises:

storing the electronic configuration settings in a database;

generating a reference identifier for the stored electronic configuration settings, wherein the database is stored on a configuration server accessible by the processor and machine readable code reader over a network connection, and wherein the configuration server transmits, over the network connection, the electronic configuration settings including the site-specific settings to the machine readable code reader in response to the matched safety check value.

2. The method of claim 1, further comprising:
verifying that the device was properly configured by comparing the safety check value to a safety check code on the first medium.

3. The method of claim 1, wherein said generating the second modified medium comprises:
applying the images of the one or more machine readable codes to an electronic version of the first medium for the device; and
printing the electronic version of the first medium with the applied one or more machine readable codes.

4. The method of claim 1, wherein the one or more machine readable codes comprises the electronic configuration settings including the site-specific settings and the safety check value and said configuring the device comprises inputting the electronic configuration settings into the device.

5. The method of claim 4, wherein there is a plurality of machine readable codes and said reading further comprises:
determining a number of the plurality of machine readable codes; and
reading each machine readable code of the plurality of machine readable codes.

6. The method of claim 1, wherein said generating the one or more machine readable codes associated with the electronic configuration settings comprises generating a machine readable code including the reference identifier and the safety check value.

7. The method of claim 6, wherein said reading the images of the one or more codes from the second modified medium comprises:
obtaining the reference identifier and safety check value from the one or machine readable codes; and
accessing the database using the reference identifier to obtain the electronic configuration settings for the device.

8. The method of claim 1, wherein the device comprises a grade crossing predictor for a railroad crossing and the one or more machine readable codes are quick response codes.

9. A system for configuring a device, said system comprising:
a computer workstation, said workstation comprising a processor adapted to:
generate electronic configuration settings for the device, the electronic configuration settings including site-specific settings and a safety check value,
generate, using a code generator, one or more machine readable codes associated with the electronic configuration settings, and
generate a second modified medium for the device by applying images of the one or more machine readable codes to a first medium for the device; and
a machine readable code reader connected to the device, said reader adapted to:
read the images of the one or more machine readable codes from the second modified medium to obtain the electronic configuration settings including the site-specific settings and the safety check value,
compare the safety check value associated with the one or more machine readable codes with a safety check value input by a user into the machine readable code reader; and
transmit the electronic configuration settings to the device to configure the device in response to a matched safety check value,
wherein said processor is further adapted to generate the electronic configuration settings for the device by:
storing the electronic configuration settings in a database; and
generating a reference identifier for the stored electronic configuration settings,
wherein the database is stored on a configuration server accessible by the processor and machine readable code reader over a network connection, and
wherein the configuration server is configured to transmit, over the network connection, the electronic configuration settings including the site-specific settings to the machine readable code reader in response to the matched safety check value.

10. The system of claim 9, wherein the machine readable code reader is adapted to verify that the device was properly configured by comparing the safety check value to a safety check code on the first medium.

11. The system of claim 9, wherein said processor is adapted to generate the second modified medium by:
applying the images of the one or more machine readable codes to an electronic version of the first medium for the device; and
outputting the electronic version of the first medium with the applied one or more machine readable codes to a printing device.

12. The system of claim 9, wherein the one or more machine readable codes comprises the electronic configuration settings including the site-specific settings and the safety check value.

13. The system of claim 12, wherein there is a plurality of machine readable codes and said machine readable code reader is adapted to:
determine a number of the plurality of machine readable codes; and
read each machine readable code of the plurality of machine readable codes.

14. The system of claim 9, wherein said processor is adapted to generate the one or more machine readable codes associated with the electronic configuration settings by generating a machine readable code including the reference identifier and the safety check value.

15. The system of claim 14, wherein said machine readable code reader is adapted to read the images of the one or more codes from the second modified medium by:
obtaining the reference identifier and safety check value from the one or machine readable codes; and
accessing the database using the reference identifier to obtain the electronic configuration settings for the device.

16. The system of claim 9, wherein the device comprises a grade crossing predictor for a railroad crossing and the one or more machine readable codes are quick response codes.

* * * * *